(12) United States Patent
Geibel et al.

(10) Patent No.: US 10,110,412 B2
(45) Date of Patent: Oct. 23, 2018

(54) DYNAMICALLY ALLOCATED COMPUTING METHOD AND SYSTEM FOR DISTRIBUTED NODE-BASED INTERACTIVE WORKFLOWS

(71) Applicant: Disney Enterprises, Inc., Burbank, CA (US)

(72) Inventors: Jonathan Geibel, Burbank, CA (US); Evan Goldberg, Burbank, CA (US); Jay Steele, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 728 days.

(21) Appl. No.: 13/842,139

(22) Filed: Mar. 15, 2013

(65) Prior Publication Data
US 2014/0108485 A1    Apr. 17, 2014

Related U.S. Application Data (60) Provisional application No. 61/715,048, filed on Oct. 17, 2012.

(51) Int. Cl.
*G06F 15/16* (2006.01)
*H04L 29/08* (2006.01)
*G06F 9/50* (2006.01)

(52) U.S. Cl.
CPC ...... *H04L 29/08135* (2013.01); *G06F 9/5061* (2013.01); *G06F 9/5072* (2013.01); *G06F 2209/509* (2013.01)

(58) Field of Classification Search
CPC ....... G06T 13/00; G06T 13/40; G06F 9/5061; H04L 29/08135

USPC ......................................................... 709/201
See application file for complete search history.

(56) References Cited

U.S. PATENT DOCUMENTS

| | | | | | |
|---|---|---|---|---|---|
| 5,896,139 | A | * | 4/1999 | Strauss | G06T 17/20 345/440 |
| 6,167,438 | A | * | 12/2000 | Yates | G06F 17/30902 707/E17.12 |
| 6,205,481 | B1 | * | 3/2001 | Heddaya | G06F 12/0813 707/E17.12 |

(Continued)

OTHER PUBLICATIONS

Chaosgroup, An update to V-Ray 2.0 is now avaiable!, URL:https://newsletters.chaosgroup.com/newsletters/preview/80, Dec. 1, 2011, pp. 1-2, retrieved on Jul. 12, 2016.

(Continued)

*Primary Examiner* — Kevin Bates
*Assistant Examiner* — Clarence McCray
(74) *Attorney, Agent, or Firm* — Sheppard Mullin Richter & Hampton LLP (57) ABSTRACT

A system and method for leveraging grid computing for node based interactive workflows is disclosed. A server system spawns a server process that receives node graph data and input attributes from a computing device, processes the data, caches the processed data, and transmits the processed data over a network to a computing device. The computing device runs a node graph application instance comprising proxy nodes configured to initiate a request to process node graph data at the server system. The server processed node graph data is displayed on the computing device. A plurality of computing devices may collaborate on a complex node graph where the node graph data processing is distributed over a plurality of servers.

26 Claims, 9 Drawing Sheets

(56) References Cited

U.S. PATENT DOCUMENTS

| | | | |
|---|---|---|---|
| 6,549,212 B1* | 4/2003 | Janzen | 345/581 |
| 7,092,983 B1* | 8/2006 | Tyrrell, III | 709/201 |
| 2004/0085335 A1* | 5/2004 | Burinyk et al. | 345/716 |
| 2005/0182844 A1* | 8/2005 | Johnson | G06F 9/54 709/230 |
| 2006/0120391 A1* | 6/2006 | Basu et al. | 370/410 |
| 2007/0080964 A1 | 4/2007 | Kainz et al. | |
| 2008/0030504 A1* | 2/2008 | Brunner et al. | 345/473 |
| 2008/0036782 A1* | 2/2008 | Bruderlin et al. | 345/581 |
| 2008/0163124 A1* | 7/2008 | Bonev | G06F 9/4443 715/853 |
| 2008/0281553 A1* | 11/2008 | Frank | A63B 24/0021 702/150 |
| 2009/0175543 A1* | 7/2009 | Nielsen | G06K 9/342 382/204 |
| 2010/0034143 A1* | 2/2010 | Cordeiro et al. | 370/328 |
| 2010/0123723 A1* | 5/2010 | Collard et al. | 345/473 |
| 2010/0134501 A1* | 6/2010 | Lowe | G06T 13/40 345/474 |
| 2011/0055588 A1* | 3/2011 | DeHaan | 713/189 |
| 2011/0296517 A1* | 12/2011 | Grigoriev et al. | 726/12 |
| 2012/0134480 A1* | 5/2012 | Leeds et al. | 379/88.12 |
| 2012/0154389 A1* | 6/2012 | Bohan | G06F 9/5044 345/419 |
| 2012/0191775 A1* | 7/2012 | Ewe | H04L 67/2861 709/203 |
| 2013/0194279 A1* | 8/2013 | Watt | G06T 13/40 345/473 |
| 2013/0232144 A1* | 9/2013 | Katsambas | G11B 27/034 707/736 |
| 2014/0047342 A1* | 2/2014 | Breternitz et al. | 715/735 |
| 2014/0108485 A1* | 4/2014 | Geibel et al. | 709/201 |

OTHER PUBLICATIONS

Chaosgroup, V-Ray 2.0 for 3ds Max new features, URL:http://www.chaosgroup.com/en/2/vray2.html, Jan. 1, 2016, pp. 1-4, retrieved on Jul. 12, 2016.

Chaosgrouptv, V-Ray RT for 3ds Max, Webinar at the Norwegian School of IT, URL:https//www.youtube.com/watch?v=BmCRF8NJP3Q>, Oct. 25, 2012, p. 1, retrieved Jul. 12, 2016.

Anonymous, Distributed Rendering—V-Ray 2.0 for 3ds Max—Chaos Group Help, URL:https://docs.chaosgroup.com/display/VRAY/Distributed+Rendering, Jan. 1, 2011, pp. 1-5, retrieved Jul. 12, 2016.

Anonymous, V-Ray RT—V-Ray 2.0 for 3ds Max—Chaos Group Help, URL:https://docs.chaosgroup.com/display/VRAY/V-Ray+RT#V-RayRT-Rendering, Jan. 1, 2011, pp. 1-8, retrieved Jul. 12, 2016.

Anonymous, Chaos Group / Chaos Software official website—home—V-Ray—award winning, production-ready 3D rendering solutions, URL:https://web.archive.org/web/20120111105122jttp://chaosgroup.com/en/2/Events2011Recap.html, Jan. 11, 2012, pp. 1-2, retrieved Jul. 12, 2016.

Anonymous, Chromium: Parallel, Distributed OpenGL Rendering on Commodity Clusters, URL:http://chromium.sourceforge.net/doc/LLNLcopy.html, Aug. 31, 2006, pp. 1-14, retrieved Jul. 12, 2016.

Anonymous, Deadline User Manual—Table of Contents, URL:htp://www.thinboxsoftware.com/deadline-downloads/deadline-offline-documentation/deadline-5044528-documentation/Deadline_Documentation_5_.0.pdf, May 16, 2011, pp. 1-26, retrieved Jul. 12, 2016.

Goslin, M. et al., The Panda3D Graphics Engine, Oct. 1, 2004, pp. 112-114, Computer, IEEE, vol. 37, No. 10, US.

Anonymous, Distributed Networking—Panda3D Manual, URL:https://web.archive.org/web/20120821145912/http://www.panda3d.org/manual/index.php/Distributed_Networking, Aug. 21, 2012, p. 1, retrieved Jul. 12, 2016.

European Patent Office, extended European search report for EP 13188900.8, pp. 1-13, Jul. 27, 2016.

* cited by examiner

DYNAMICALLY ALLOCATED COMPUTING METHOD AND SYSTEM FOR DISTRIBUTED NODE-BASED INTERACTIVE WORKFLOWS

CROSS-REFERENCE TO RELATED APPLICATIONS

This application claims the benefit of U.S. Provisional Application No. 61/715,048 filed on Oct. 17, 2012, which is hereby incorporated herein by reference in its entirety.

TECHNICAL FIELD

The present disclosure relates generally to distributed computing, and more particularly, some embodiments relate to systems and methods for leveraging the processing power of distributed computing technologies for real-time node-based interactive workloads.

DESCRIPTION OF THE RELATED ART

Currently, resource-intensive computing tasks, both in the enterprise and consumer market, are relegated to high-performance desktop computers running on operating systems such as Windows®, MacOS®, or Linux®. This is particularly true of node-based graphical software applications that process complex node graphs. Laptops, tablets, and other mobile devices generally lack the hardware requirements sufficient to run these applications efficiently. Moreover, even high-performance desktop systems can take considerable time to process node graphs that render complex animation scenes developed on software applications such as Nuke®, Maya®, and Houdini®.

BRIEF SUMMARY OF THE DISCLOSURE

According to various embodiments of the disclosed method and system, distributed computing technologies are leveraged to improve the efficiency of a node-based graphical software application. In one embodiment, a server system spawns a server process that receives node graph data and input attributes from a computing device, processes the data, and transmits the processed data over a network to a computing device. In another embodiment, the server process caches processed data. In yet another embodiment, the server executes an instance of a node graph application that can process the received node data and input attributes According to another embodiment, a computing device runs a node graph application that initiates a request at an proxy node to process node graph data on a server system. In one embodiment, the computing device node graph application locally caches processed node graph data.

According to another embodiment, a plurality of computing devices dynamically collaborate on the modification of a node graph. In one embodiment, the plurality of computing devices collaborate on a node graph application instance executed on a server system.

Other features and aspects of the disclosed method and system will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

The figures are not exhaustive and do not limit the disclosure to the precise form disclosed.

DETAILED DESCRIPTION OF THE EMBODIMENTS OF THE DISCLOSURE

Figure 1A:
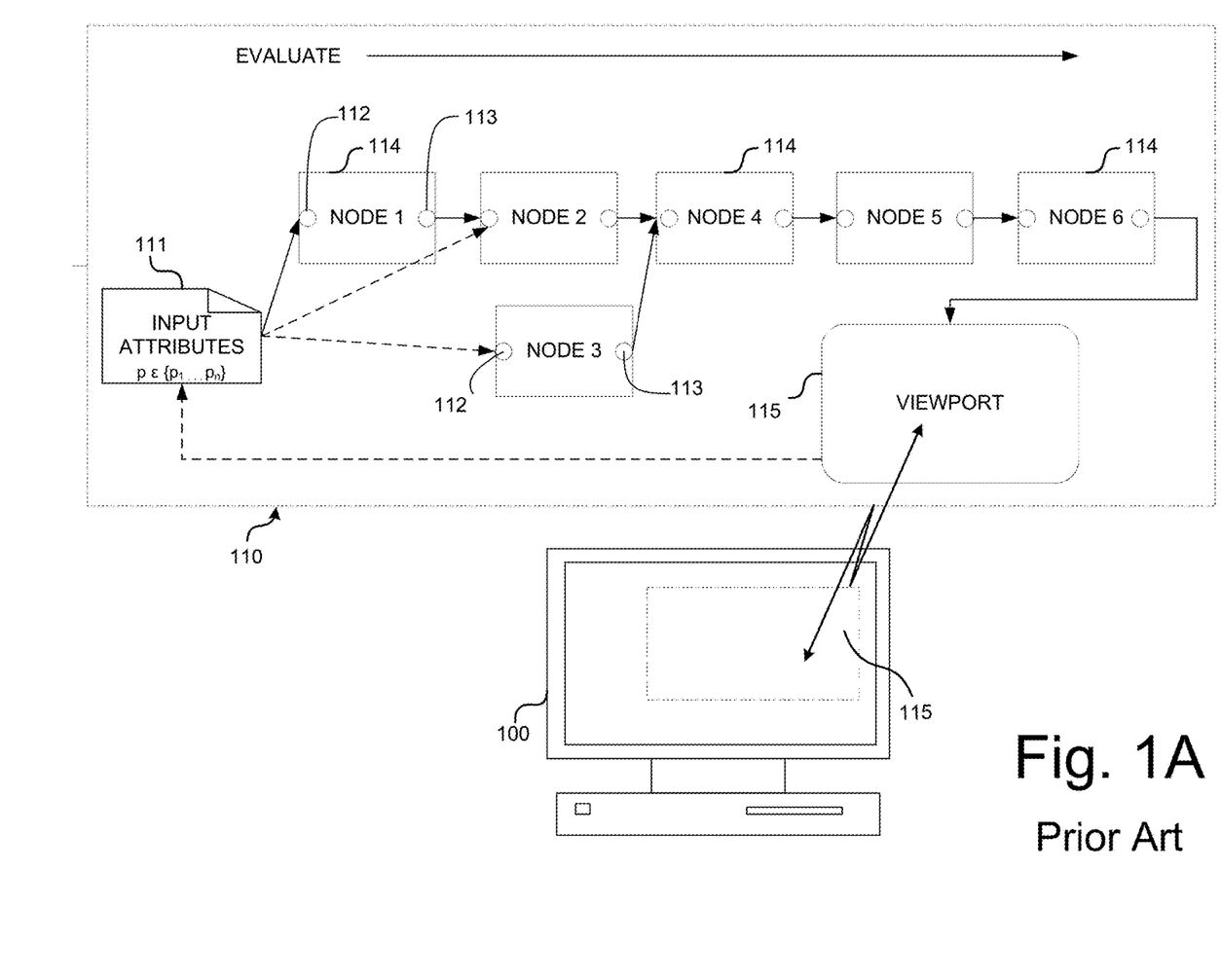
FIGS. 1A-1B illustrate a desktop environment in which node based graphical applications are processed.

Before describing the disclosed method and system in detail, it is useful to describe the current desktop environment in which node-based graphical applications are processed. FIG. 1A illustrates the current desktop environment. Desktop workstation 100 initiates a node graph application instance 110 to process node graph data (i.e., one or more nodes and their corresponding connectivity in a node graph). In this example environment, the node graph comprises six nodes. Each depicted node may comprise a single node or a group of nodes. The processed node graph data is visually rendered as a static image or animation scene on the monitor of workstation 100 via viewport 115. The user of workstation 100 can modify the input attributes 111 of nodes in the node graph by manipulating objects in viewport 115 or by directly updating the input attributes 111 of a node 114 in the node graph. The attributes of a node describe the data that belongs to nodes of a given type. For example, the nodes associated with an animation sphere may comprise attributes such as radius, angular momentum, position, color, and transparency. Groups of nodes 113 may share input attributes 111, or alternatively, multiple nodes can have their own sets of input attributes. In this desktop environment, input attributes may be entered at any node in the graph. Once the input attributes 111 are entered, workstation 100 begins processing the node graph down the chain. In this example, Node 1 receives input attributes at input 112. After input attributes 111 are processed at node 1, node 1 output 113 passes output attributes to node 2's input. Node 4's input 112 waits for input data from the outputs of Node 2 and Node 3. This process continues until the data is processed at node 6, the final node in the graph. The processed node graph data is visually rendered through viewport 115.

Figure 1B:
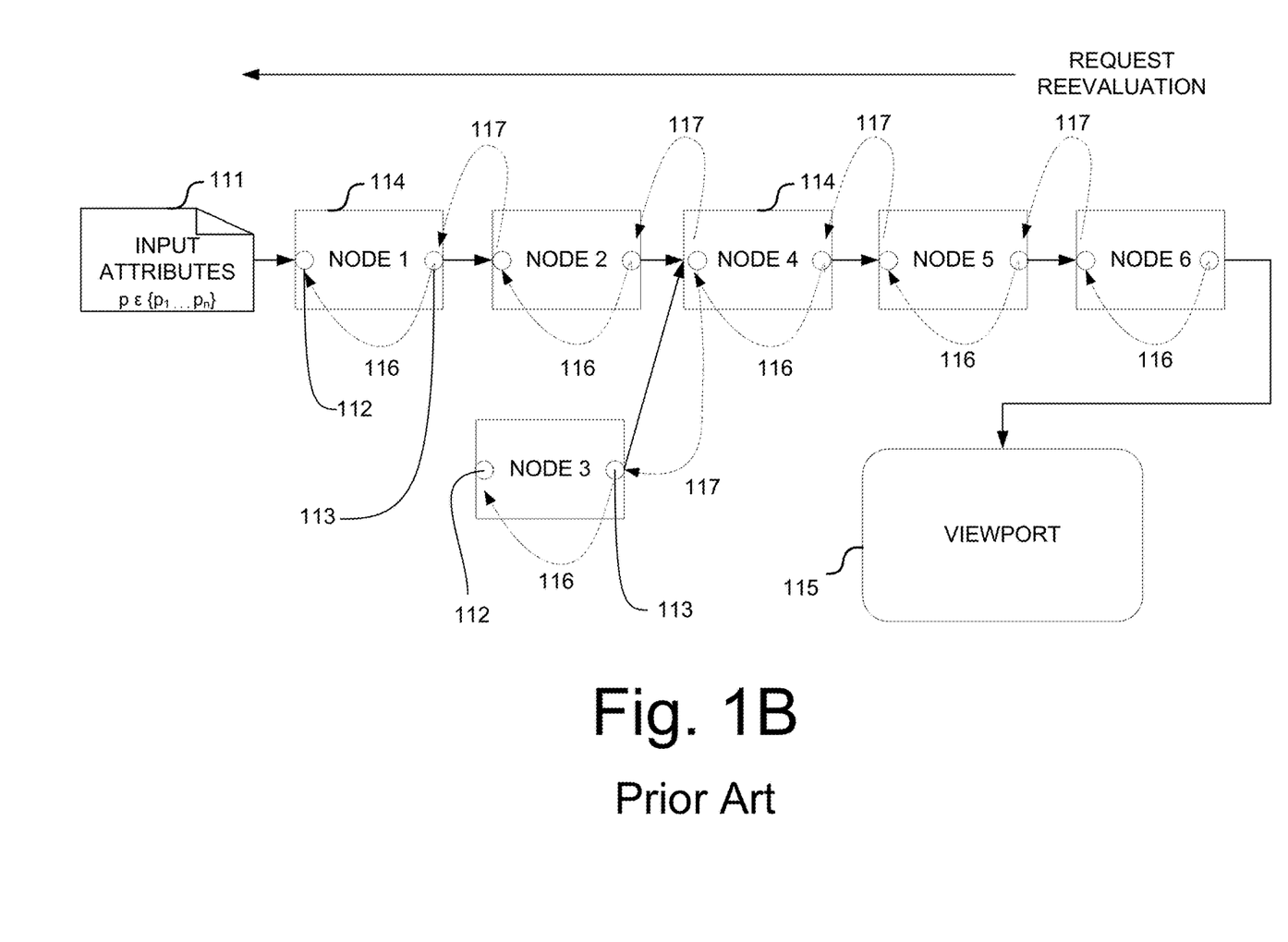

Each time the node graph is modified or a call to update the node graph is executed, this processing chain is repeated only for data that needs to be recalculated. Node graph applications accomplish this by flagging a node's inputs 112 and outputs 113. When an input value 112 is changed, the node's dependent output 113 is flagged. Any connection to the flagged output 113 is also flagged and this propagation continues until the data flow end of the node graph is reached. As illustrated in FIG. 1B, when the node graph application requests a node graph reevaluation, the node graph application checks if a node's outputs are flagged, starting with the end of the node graph data flow evaluation chain. For example, if Node 6 determines it is flagged at 116, it is instructed to evaluate itself. When that node evaluates, it sees that its inputs are flagged and asks any connected input node at 117 to reevaluate itself. As the inputs and outputs of the nodes are evaluated, the inputs and outputs are unflagged. This process continues until the data in the node graph is reevaluated, and the inputs and outputs are no longer flagged. In this manner, only flagged nodes are evaluated.

In the desktop environment of FIGS. 1A-1B, all node graph data is processed locally on workstation 100. As the complexity of the node graph increases, the speed at which the node graph data in application instance 110 is processed and rendered on viewport 115 is limited by the processing capabilities of workstation 100. In this desktop environment, the processing power of the user's workstation 100 is the bottleneck for the efficient processing of complex node graphs such as animation scenes. Moreover, the desktop environment of FIG. 1A does not provide a way for multiple users to collaborate efficiently on a node based graphical application.

Figure 2:
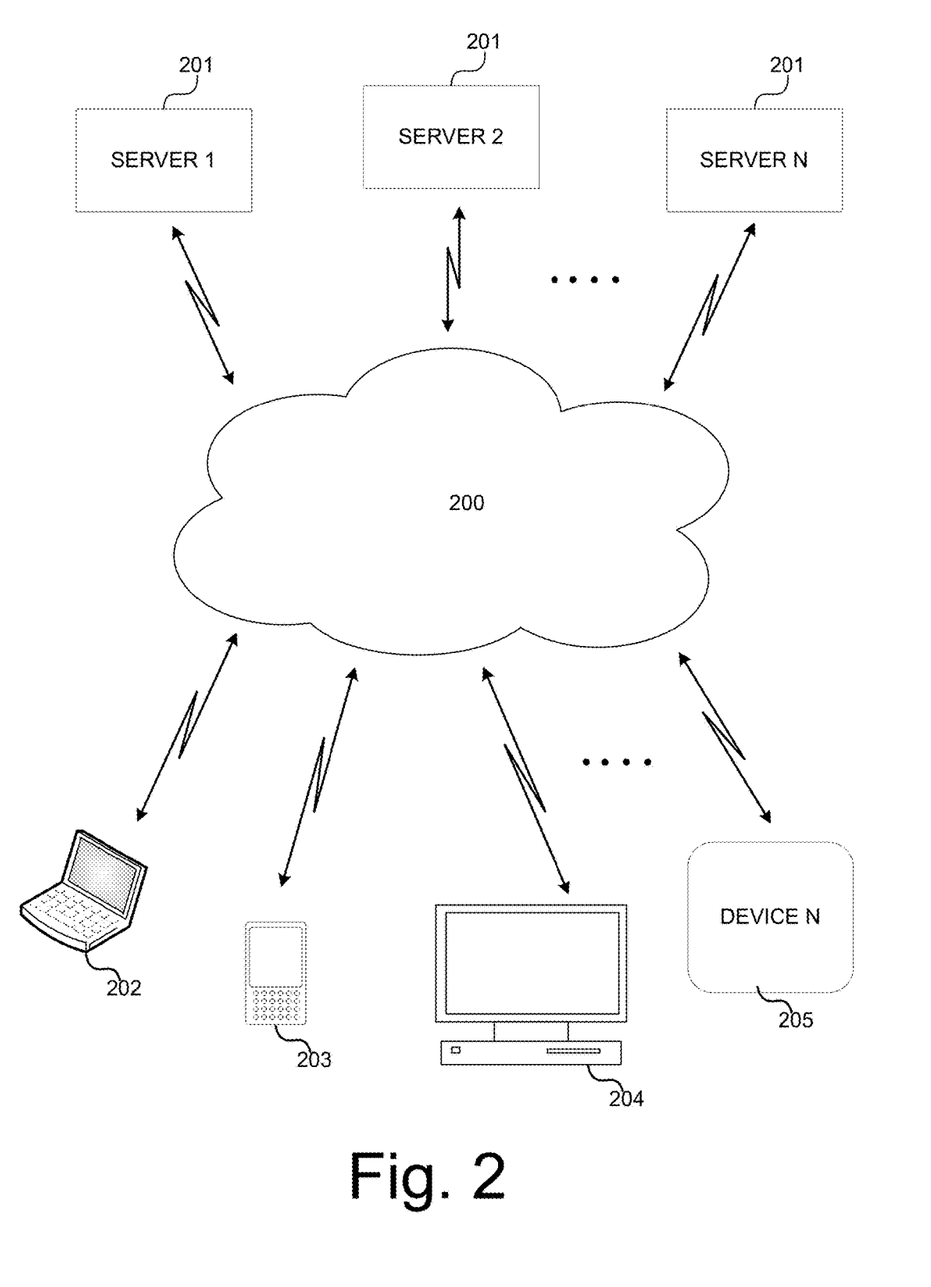
FIG. 2 illustrates a distributed computing communication system for processing node based graphical applications.

FIG. 2 illustrates one example of a distributed computing communication system for distributed node based graphical workflows. The communications system includes a plurality of computing devices 202-205, each communicating with other computing devices 202-205 and servers 201 through communications network 200. Computing devices 202-205 may comprise, but are not limited to, workstation, desktop, laptop, notebook, and tablet computers; and hand-held devices such as tablets, PDA's, smartphones, cellphones, and palmtops. In communications network 200, the processing of some or all of the node based graphical data generated by users operating computing devices 202-205 is distributed over multiple servers 201. In some embodiments, these multiple servers may be implemented as a grid computer.

As used herein, communications network 200 may refer to any network that allows for a distributed computing system. Communications network 200 may include a cloud computing network, an ad hoc network, an intranet, an extranet, a virtual private network (VPN), a local area network (LAN), a wireless LAN (WLAN), a wide area network (WAN), a portion of the Internet, a portion of the Public Switched Telephone Network (PSTN), a cellular telephone network, a peer-to-peer network (P2P), or any combination thereof. Communications network 200 may use a number of communication mediums. The communication medium may be a wired system, such as a coaxial cable system, a fiber optic cable system, an Ethernet cable system, or other similar communication medium. Alternatively, the communication medium may be a wireless network system, such as a wireless personal area network, a wireless local area network, a cellular network, or other similar communication medium.

Figure 3:
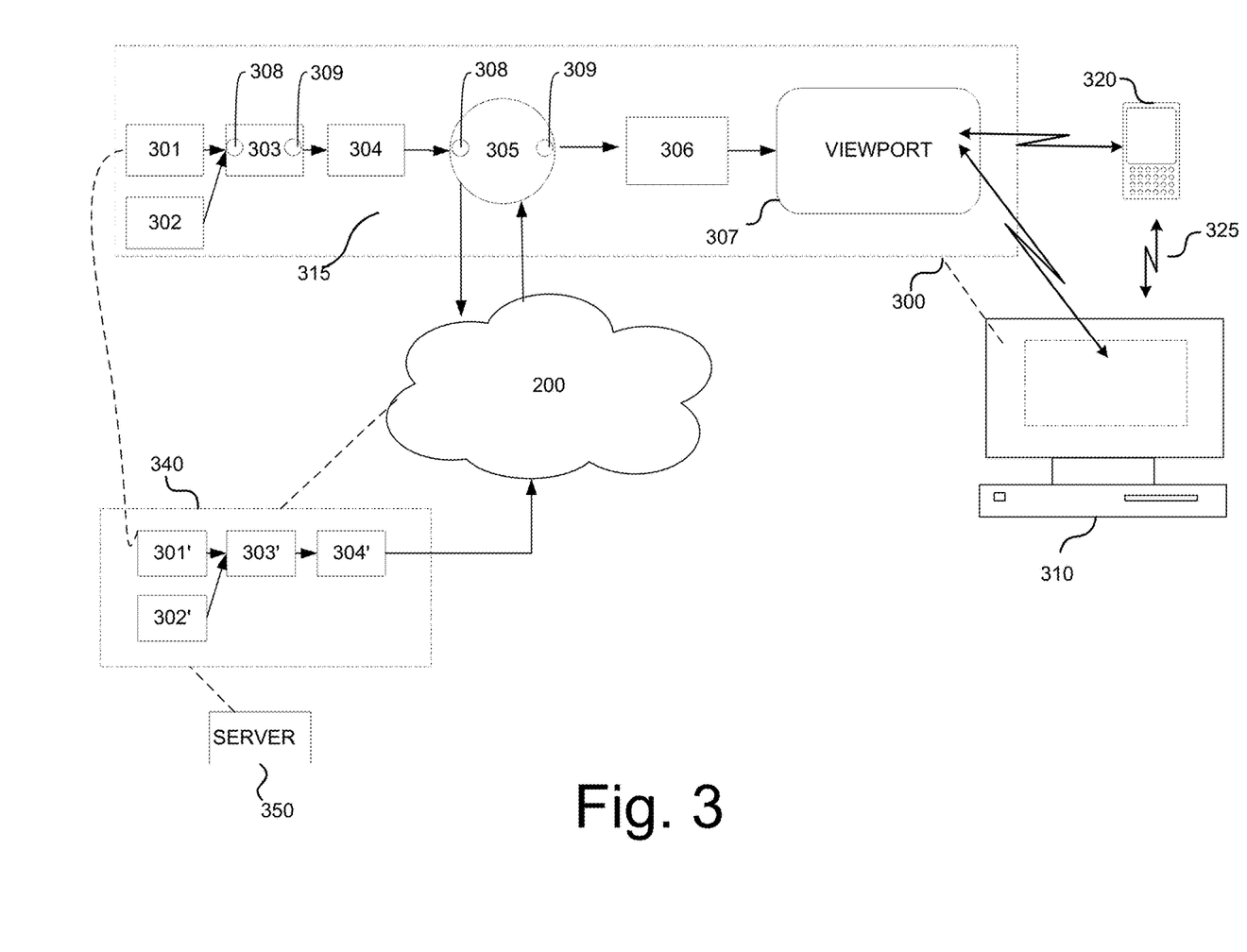
FIG. 3 is a block diagram of a node based graphical workflow utilizing the communication system in FIG. 2.

FIG. 3 illustrates an exemplary embodiment of a node based graphical workflow in accordance with the distributed computing communication system of FIG. 2. Computer 310 initiates node graph application instance 300. The node graph 315 of application instance 300 is rendered on the monitor of workstation 300 via viewport 307.

In some implementations, the rendered node graph data on viewport 305 may also be pushed to the display of a mobile device 320, which is in direct communication 325 with desktop computer 310. Communication 325 may be implemented wirelessly using any number of communication protocols, such as Bluetooth or 802.11x wireless LAN protocols. Alternatively, the desktop computer may be in wired communication 325 with the mobile device. The wired connection may be implemented using a variety of interfaces, such as USB 2.0, USB 3.0, Thunderbolt, or other available protocols. Thus, the rendered node graph data may be pushed from the desktop computer 310 to the mobile device 320 over wired or wireless communication media. As will become apparent from later descriptions, the mobile device 320 may alternatively receive the rendered node graph data through communications network 200.

With reference now to node graph application instance 300, the processed node graph 315 comprises five standard nodes 301, 302, 303, 304 and 306, and one proxy node 305.

Server 350, which runs node graph application instance 340, saves a copy of all user inputs associated with the nodes preceding proxy node 305 in the data flow evaluation sequence (i.e., nodes 301, 302, 303, 304). Server 350 comprises the nodes 301', 302', 303', and 304' (copies of nodes 301, 302, 303, and 304), which are processed based on these saved user inputs.

A proxy node 305 is any computer module that is used to intercept a node graph. When the viewport 307 refreshes or a request to reevaluate the node graph is initiated, the proxy node 305 checks to see if its output 309 has been flagged for reevaluation. If the proxy node 305 has been flagged for reevaluation, the proxy node 305 initiates a request to have all connected input nodes 301, 302, 303, 304 and their corresponding input attributes processed in a server 350. In some cases, this request may be limited to flagged input node chains. Proxy node 305 may comprise locality metadata that specifies on what server the nodes are processed. Moreover, proxy node 305 may be configured to forward the data for local processing (i.e. not initiate a request for server processing) if the local processing bandwidth exceeds a certain threshold.

Proxy node 305 may also determine whether the node graph data has been previously processed and cached on the same LAN as the computing device, the computing device itself, or a storage medium attached to the computing device. If the node graph data has been cached, the proxy node 305 may return the cached data as its output 309 instead of calling the server application instance 340. The proxy node 305 thus improves computational efficiency by helping distribute the processing of node graph data to a server 350 and by checking for cached, processed node graph data. Each node graph may comprise one or more proxy nodes 305 to distribute the processing of complex groups of nodes to one or more servers 350.

The placement of a proxy node 305 in the node graph may be determined by the node graph application instance based on the node graph's computational requirements. In other embodiments, the proxy nodes 305 may be manually placed by the users of one or more computing devices. For example, an illustrator working on an animated character in a scene might place a proxy node 305 in front of a portion of the node graph defining the scene.

In application instance 300, when a user manipulates objects in viewport 307 or directly updates the input attributes of a node, a marker of flagged inputs 308 and outputs 309 is propagated forward. For example, if the user modifies the input attributes of node 301, then the inputs 308 and outputs 309 of nodes 303, 304, 305, and 306 are flagged. In this example embodiment, server system 350 maintains a copy of all user inputs associated with nodes preceding proxy node 305 in the data flow evaluation—that is, nodes 301, 302, 303, 304. When nodes 301, 302, 303, and 304 are flagged, a marker of flagged inputs and outputs is also propagated forward in server nodes 301', 302', 303', 304'. In addition, server node 304' flags proxy node 305 for reevaluation. In other embodiments, server 350 may maintain a copy of all user inputs associated with all nodes in application instance 300. Once all inputs 308 and outputs 309 have been flagged in the node graph 315, evaluation of the node graph 315 may be initiated automatically or when the viewport 307 refreshes.

Beginning with node 306, a check is made to see if its outputs 309 have been flagged. After determining that its outputs are flagged, node 306 is instructed to evaluate itself. When node 306 evaluates, it sees that its inputs 308 are flagged and asks connected proxy node 305 to evaluate itself. After determining that its inputs 308 are flagged, proxy node 305 initiates a request over communications network 200 to have all connected input nodes 301, 302, 303, 304 and corresponding input attributes processed by server 350.

Server 350, which saved a copy of all user inputs associated with nodes 301, 302, 303, 304, runs node graph application instance 340, which processes nodes 301', 302', 303', and 304' (copies of nodes 301, 302, 303, and 304) based on the saved user inputs. Server 350 may process nodes 301', 302', 303', and 304' in the same manner as any other node graph application instance. That is, data flow processing is performed only for flagged nodes. In other embodiments, server 350 may process all nodes regardless of whether they have been flagged.

After processing nodes 301', 302', 303', and 304', server 350 transmits the processed node graph data over communications network 200 back to proxy node 305. The remaining unprocessed node 306 is processed in application instance 300 based on the input attributes received from proxy node 305 and rendered on viewport 307.

Figure 4:
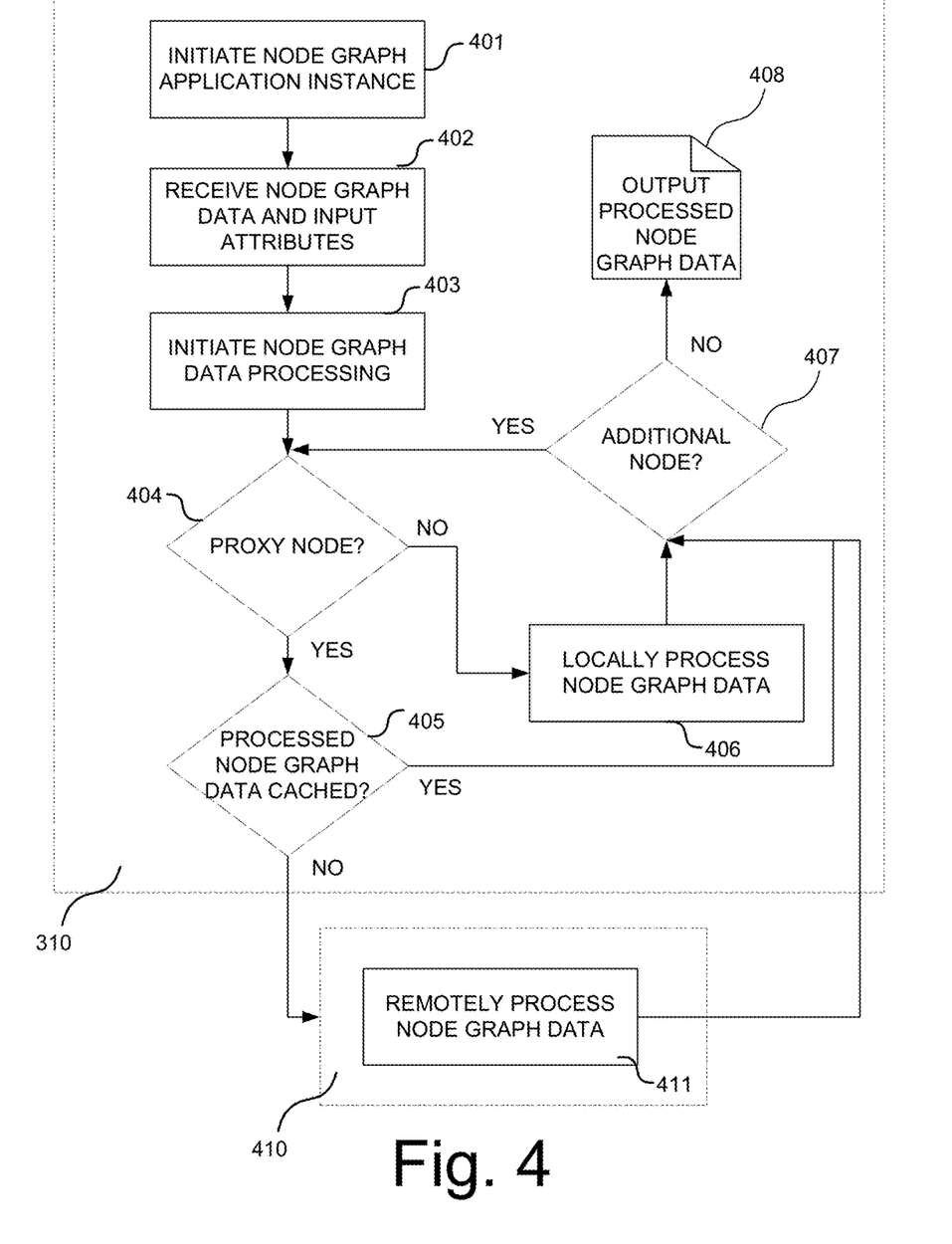
FIG. 4 illustrates a computing device side method of processing node graph data and input attributes.

FIG. 4 describes a method for leveraging distributed computing for processing a node graph like the one in application instance 300. In step 401, computing device 310 initiates a node graph application instance 300. In some implementations, the step 401 of initiating a node graph application instance 300 may also comprise transmitting an instruction to a server 350 to initiate a node graph application instance comprising a parallel copy of nodes. At step 402, the computing device receives node graph data and input attributes from the user of computing device 310, from storage on computing device 310, from network storage on communications network 200, or from some other source. Step 402 may further comprise transmitting the node graph data and input attributes to server 350 to allow the sever 350 to update its parallel copy of nodes and associated input attributes. In step 403, node graph data processing is initiated either automatically or in response to a call to the node graph application instance to initiate processing. If data is not received at an proxy node (step 404), the data is locally processed (step 406). If data is received at an proxy node (step 404), a check is performed to see whether the node graph data has been previously processed and cached (step 405). If cached data is detected within the same LAN as computing device 310, the computing device 310, or a storage medium attached to computing device 310, the data is forwarded without reprocessing the node graph data, thus saving computational time. If cached data is not detected, the proxy node initiates a request over communications network 200 to process the node graph data on server system 410 (step 411). At step 407, a query is made for additional nodes. If there are no additional nodes to process, the processed node graph data is output (step 408) on a viewport.

Figure 5:
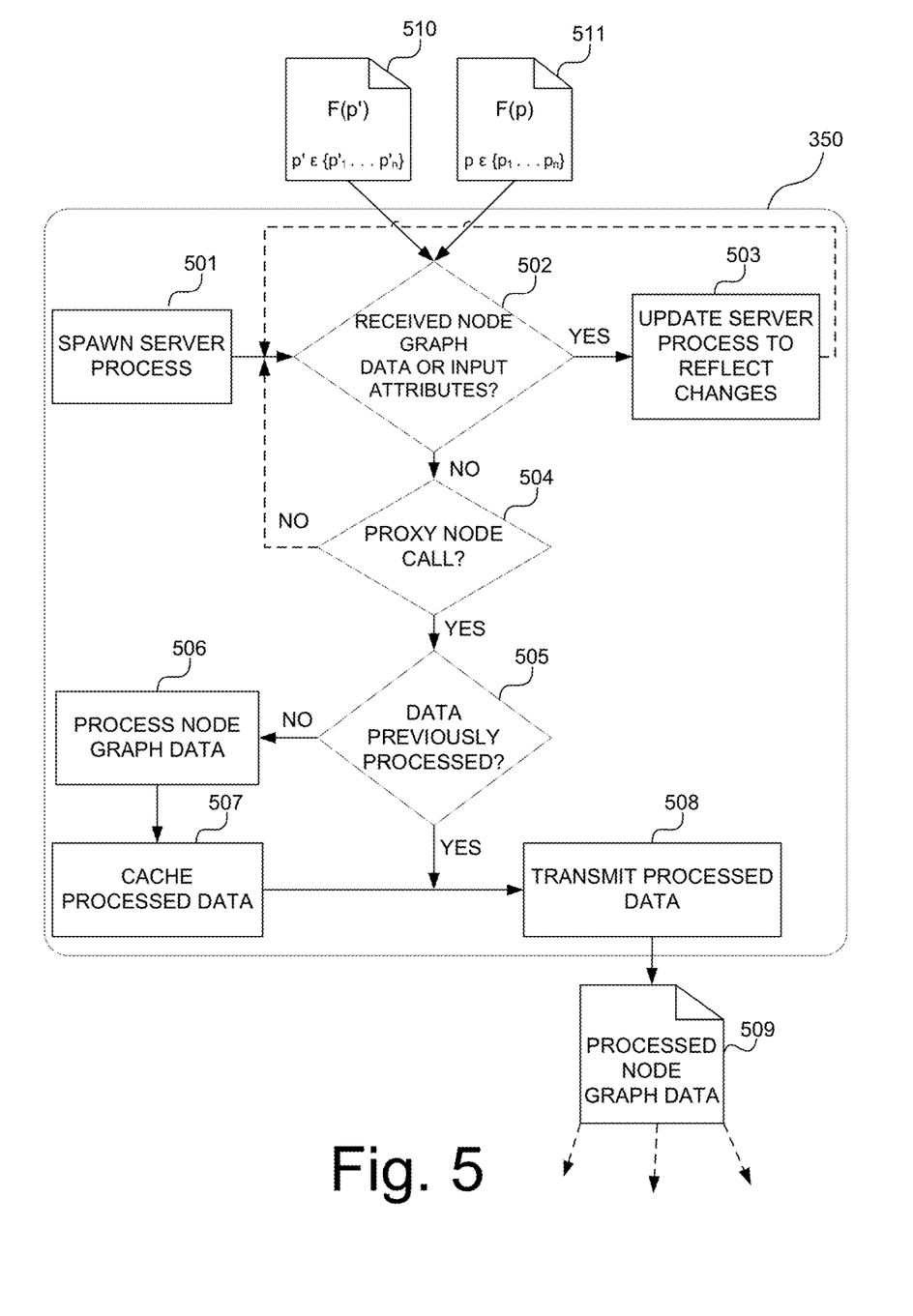
FIG. 5 illustrates a server side method of processing node graph data and input attributes received from one or more computing devices.

Turning now to the server side, FIG. 5 illustrates a server side method of leveraging distributed computing to node graph data and input attributes 510-511 received from a plurality of computing devices at server 350. For example, two collaborators working on a character animation scene could modify discrete portions of a node graph represented by node graph data and input attributes 510 (for example, a character) and node graph data and input attributes 511 (for example, the character's environment). Server 350 spawns a server process (step 501) configured to receive and process node graph data and input attributes. Each time the server process receives node graph data and input attributes (step 502) from an instance of the node graph running on a client, the server updates the server process to reflect the changes to the server process' node graph data and input attributes (step 503). If the server receives a call from an proxy node to process the node graph data based on the input attributes (step 504), the server process begins to process the data. The server process determines if the node graph data has previously been processed and cached (step 505). If the node graph data has not been previously processed and cached, the node graph data is processed at the server based on the node graph input attributes (step 506). The processed data is then cached (step 507) and transmitted (step 508) to a plurality of computing devices (step 509) over communications network 200. The server-processed data may be transmitted automatically or in response to a request initiated at an application running on a computing device.

The server 350 may comprise a plurality of servers. These multiple servers may be implemented as a grid-computer. The server process may be used to distribute computations, such as computation of node graphs, across multiple servers. Animation nodes, for example, may be evaluated in a distributed manner and then assembled into shots to be streamed to a plurality of computing devices. Additionally, the server process may be configured to move processing tasks between the local node graph application and the remote server instance. This ability to dynamically spread the computation of node graphs across local or remote compute devices, may be live or on-demand. Moreover, node graph data stored on a server for reuse may be preloaded each time a server process is spawned.

The server 350 may be heterogeneous (i.e. independent of the node graph application). For example, a server 350 may receive a plurality of node graph data sets for processing from a plurality of computing devices running different node graph applications such as Maya, Nuke, and Houdini. Server 350 may comprise a computer module configured to provide syntactic and semantic interoperability. Semantic interoperability may be provided among these different node graph applications using a common information exchange reference model. For example, the server 350 may receive for processing node graph data from a computing device running a Maya node graph application instance. Before transmitting the processed node graph data to a computing device running a Nuke node graph application instance, the server may translate the Maya node graph data using a common information exchange reference model.

Additionally, the server process may provide a management system to track where data is computed, where it connects to in the parent node graph, who currently is editing/modifying the node graph, and whether or not the data is live or editable.

Figure 6:
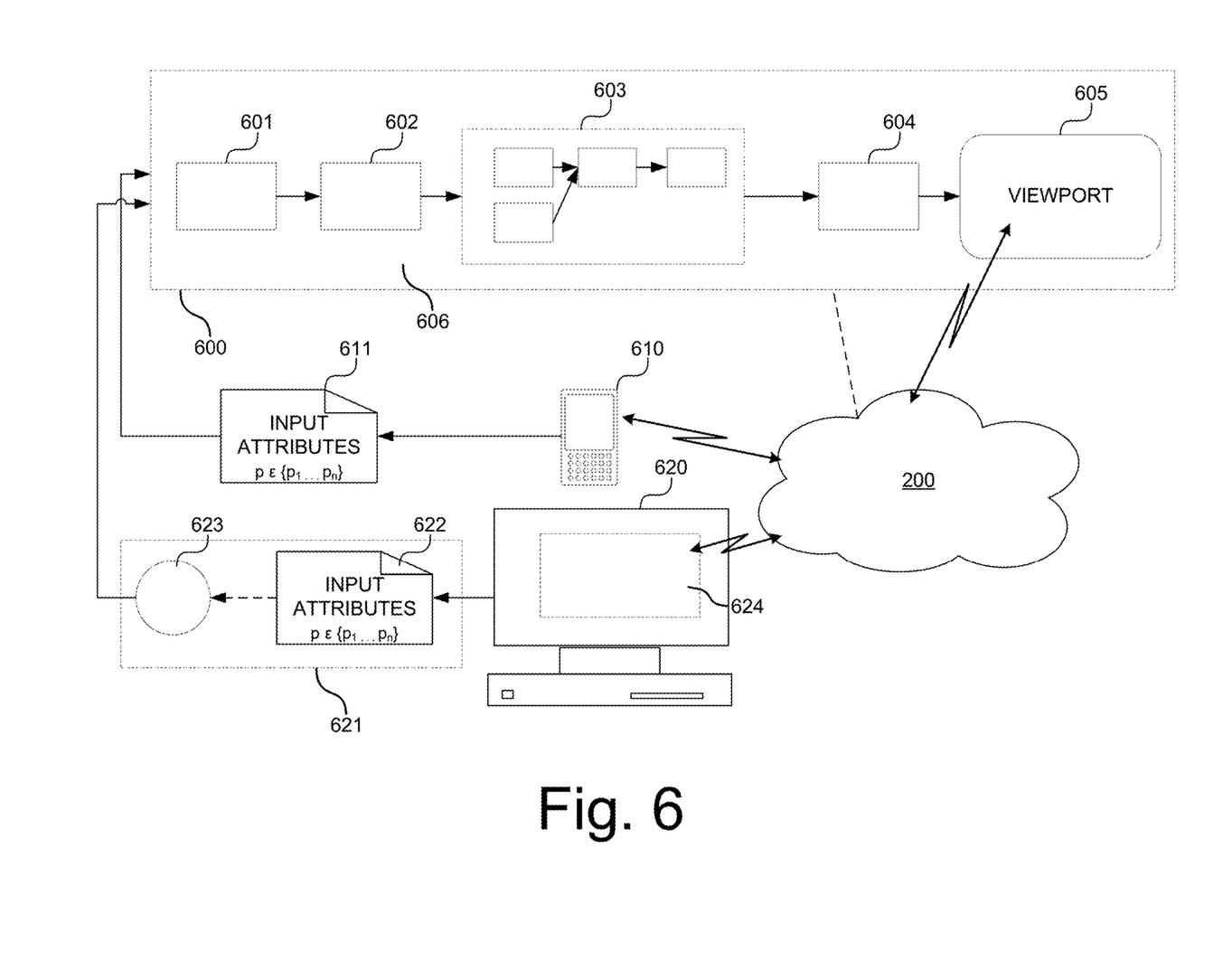
FIG. 6 illustrates an example of a node based collaborative workflow using the communication system of FIG. 2.

FIG. 6 illustrates an example of a node based collaborative workflow using the grid computing communication system of FIG. 2. In this embodiment, the users of mobile device 610 and desktop computer 620 collaborate on the modification of a viewport-driven node graph. A server system in communication with computing devices 610 and 620 over communications network 200 remotely executes a node graph application instance 600. In this exemplary environment, the node graph is directly manipulated on server application instance 600 in response to input attributes 611 and 622 received from mobile device 610 and desktop computer 620. Input attributes 611 and 622 may be directed at any one of nodes 601, 602, 604, or node group 603. In yet other embodiments the users of devices 610 and 620 may additionally input node graph data that changes the node graph executed by node graph application instance 600.

In this embodiment, mobile device 610 does not execute the node graph application instance. Instead, the server processed viewport 605 is remotely streamed to mobile device 610 over communications network 200. In other embodiments, mobile device 610 may locally run the node graph application instance. In yet other embodiments, only the viewport is streamed over communications network 200 while the other node graph application components are executed by the mobile phone's native operating system.

Desktop computer 620 executes node graph application instance 621, which has an proxy node 623 that initiates a request to process the entire node graph 606 based on input attributes 622 on a server system running application instance 600. The processed viewport 605 is then streamed back to desktop computer 620 over communications network 200. In other embodiments, desktop computer 620 may not locally execute a node graph application instance.

Figure 7:
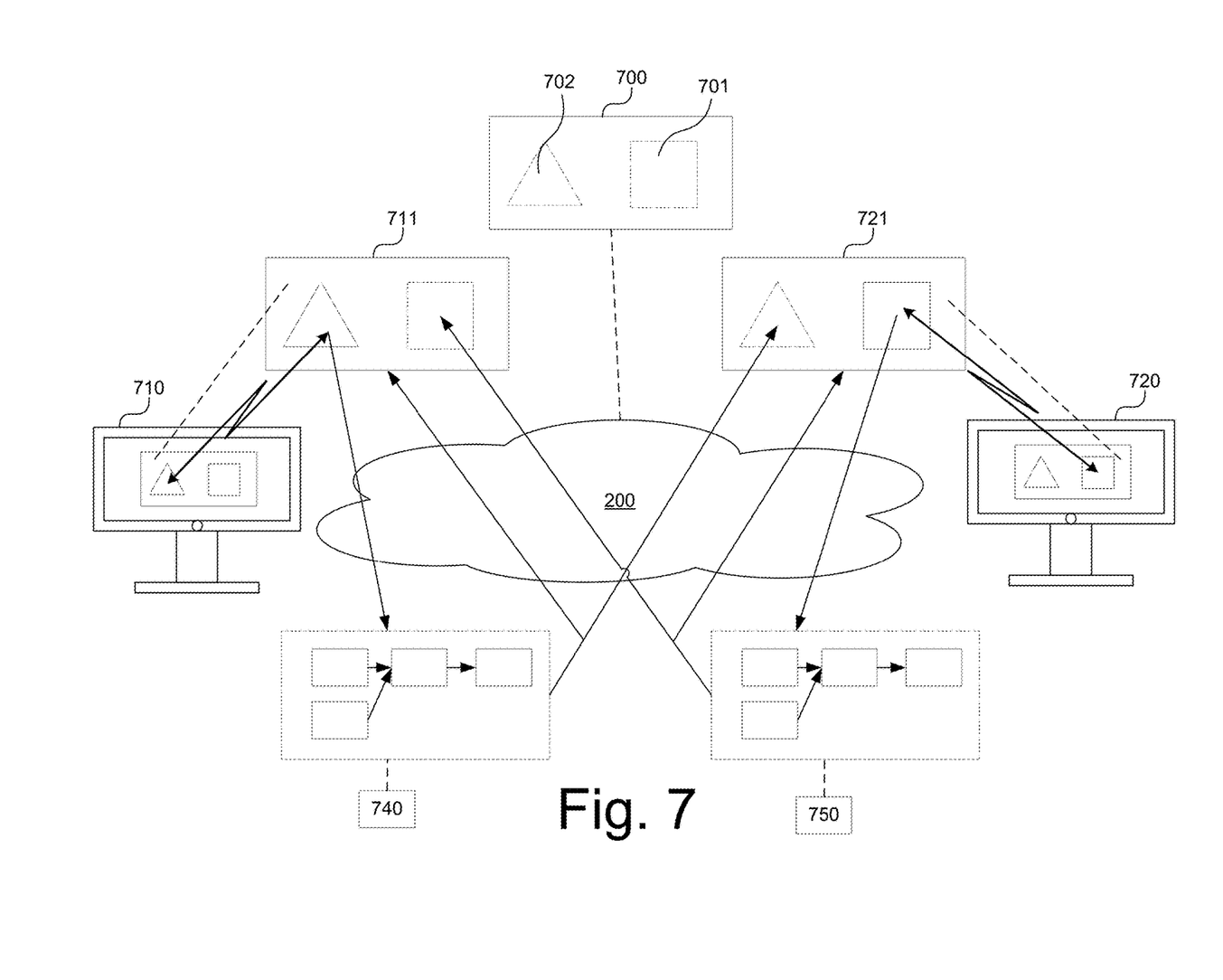
FIG. 7 illustrates another example of a node based collaborative workflow using the communication system of FIG. 2.

FIG. 7 illustrates yet another example of a node based collaborative workflow using the grid computing communication system of FIG. 2. Users operating workstations 710 and 720 collaborate on the editing of a node graph (not pictured) that outputs a triangle 702 and square 701. In this example, the user of workstation 710 directly manipulates a triangle and has a live node graph that feeds into his viewport through communications network 200. Similarly, the user of workstation 720 manipulates a square and has a live node graph that feeds into his viewport 721 through communications network 200.

In this example, the processing of all node graph data is remotely performed over a server system (not pictured) in communication with workstations 710 and 720 through communications network 200. The server system runs a server process that distributes the computation of the triangle 702 over server 740 and the computation of the square 701 over server 750. The server processed viewport data for a manipulation not performed on a workstation may be automatically pushed to the workstation or may be pushed to the workstation in response to a request from the user of the workstation.

Viewport 700 represents the viewport of a third computing device (not pictured) that is not involved in the manipulation of the node graphs corresponding to the triangle 702 and square 701. The updated viewport may be automatically pushed over communications network 200 or it may be pushed in response to a request from the user of the device with viewport 700.

Figure 8:
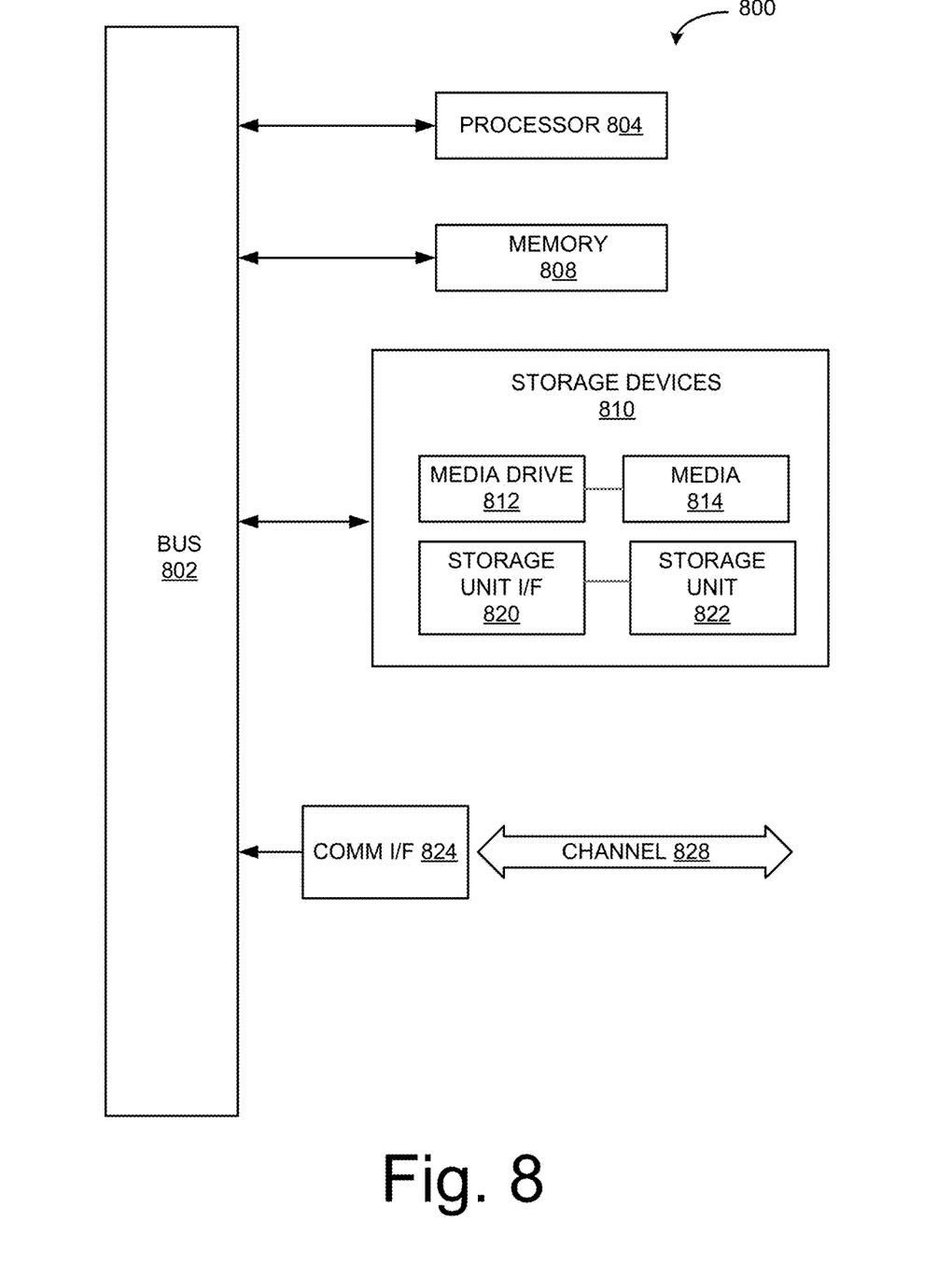
FIG. 8 illustrates an example computing module that may be used to implement various features of the system and methods disclosed herein.

FIG. 8 illustrates an example computing module that may be used to implement various features of the system and methods disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 8. Various embodiments are described in terms of this example-computing module 800. After reading this description, it will become apparent to a person skilled in the relevant art how to implement the application using other computing modules or architectures.

Referring now to FIG. 8, computing module 800 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 800 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 800 might include, for example, one or more processors, controllers, control modules, or other processing devices, such as a processor 804. Processor 804 might be implemented using a general-purpose or special-purpose processing engine such as, for example, a microprocessor, controller, or other control logic. In the illustrated example, processor 804 is connected to a bus 802, although any communication medium can be used to facilitate interaction with other components of computing module 800 or to communicate externally.

Computing module 800 might also include one or more memory modules, simply referred to herein as main memory 808. For example, preferably random access memory (RAM) or other dynamic memory, might be used for storing information and instructions to be executed by processor

804. Main memory 808 might also be used for storing temporary variables or other intermediate information during execution of instructions to be executed by processor 804. Computing module 800 might likewise include a read only memory ("ROM") or other static storage device coupled to bus 802 for storing static information and instructions for processor 804.

The computing module 800 might also include one or more various forms of information storage mechanism 810, which might include, for example, a media drive 812 and a storage unit interface 820. The media drive 812 might include a drive or other mechanism to support fixed or removable storage media 814. For example, a hard disk drive, a floppy disk drive, a magnetic tape drive, an optical disk drive, a CD or DVD drive (R or RW), or other removable or fixed media drive might be provided. Accordingly, storage media 814 might include, for example, a hard disk, a floppy disk, magnetic tape, cartridge, optical disk, a CD or DVD, or other fixed or removable medium that is read by, written to or accessed by media drive 812. As these examples illustrate, the storage media 814 can include a computer usable storage medium having stored therein computer software or data.

In alternative embodiments, information storage mechanism 810 might include other similar instrumentalities for allowing computer programs or other instructions or data to be loaded into computing module 800. Such instrumentalities might include, for example, a fixed or removable storage unit 822 and an interface 820. Examples of such storage units 822 and interfaces 820 can include a program cartridge and cartridge interface, a removable memory (for example, a flash memory or other removable memory module) and memory slot, a PCMCIA slot and card, and other fixed or removable storage units 822 and interfaces 820 that allow software and data to be transferred from the storage unit 822 to computing module 800.

Computing module 800 might also include a communications interface 824. Communications interface 824 might be used to allow software and data to be transferred between computing module 800 and external devices. Examples of communications interface 824 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 824 might typically be carried on signals, which can be electronic, electromagnetic (which includes optical) or other signals capable of being exchanged by a given communications interface 824. These signals might be provided to communications interface 824 via a channel 828. This channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 808, storage unit 820, media 814, and channel 828. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 800 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method, comprising:
    spawning within a server system a server process that communicates over a network;
    receiving node graph data and input attributes at the server system from a node graph application instance executed by a computing device, wherein the received node graph data comprises a copy of one or more nodes preceding a proxy node in a node graph of the node graph application instance, and wherein the received input attributes comprise a copy of user inputs associated with the one or more nodes preceding the proxy node;
    receiving, over the network, a request from the proxy node to evaluate the node graph data;
    evaluating the node graph data at the server process based on the input attributes, wherein evaluating the node graph data comprises evaluating the copy of one or more nodes using at least the copy of user inputs; and
    transmitting the evaluated node graph data over the network from the server system to the proxy node for rendering on a viewport.

2. The method of claim 1, further comprising: caching the evaluated node graph data at the server system.

3. The method of claim 2, further comprising: preloading node graph data stored at the server system.

4. The method of claim 2, wherein evaluating the node graph data and caching the evaluated node graph data are performed if the server process determines that it has not previously evaluated the node graph data.

5. The method of claim 4, wherein the server evaluated node graph data is automatically transmitted to the computing device based on an update frequency specified by the computing device.

6. The method of claim 4, further comprising: executing an instance of an application on the server system that can evaluate the received node graph data and input attributes.

7. The method of claim 6, wherein the server system receives a plurality of node graph data sets and input attribute sets from a respective plurality of computing devices, and wherein each evaluated node graph data set is transmitted over the network to the plurality of computing devices.

8. A method, comprising:
    initiating a node graph application instance at a computing device;
    initiating evaluation of node graph data at the application based on input attributes received at the computing device, the node graph data comprising a node graph comprising a proxy node and one or more nodes preceding the proxy node in the node graph;
    transmitting to a server system a copy of the one or more nodes preceding the proxy node and a copy of user inputs associated with the one or more nodes preceding the proxy node;
    receiving the evaluating node graph data at the proxy node;
    initiating a request at the proxy node to evaluate the one or more nodes preceding the proxy node on the server system; and
    receiving over a network from the server system, server evaluated node graph data comprising an evaluation of the one or more nodes.

9. The method of claim 8, further comprising: determining if the node graph data has been locally cached before initiating a request at the proxy node to evaluate the one or more nodes on the server system.

10. The method of claim 9, further comprising: receiving the evaluating node graph data at a second proxy node, wherein the node graph comprises the second proxy node and one or more nodes preceding the second proxy node, and wherein the method further comprises: initiating a request at the second proxy node to evaluate the one or more nodes preceding the second proxy node on a server system.

11. The method of claim 8, further comprising: receiving the server evaluated node graph data at a viewport in the application, wherein the viewport is configured to output the evaluated node graph data on a display connected to the computing device.

12. The method of claim 11, further comprising: querying a server system for additional evaluated node graph data wherein the additional evaluated node graph data is evaluated in response to input attributes received from a second computing device running the application.

13. The method of claim 12, wherein node graph application is executed on the server system.

14. The method of claim 8, wherein the application is NUKE, Houdini, or Maya.

15. A non-transitory computer-readable medium having executable instructions stored thereon that, when executed by a processor, perform the operations of:
spawning a server process that runs inside of a grid computing instance that communicates over a network;
receiving node graph data and input attributes from a node graph application instance executed by a computing device, wherein the received node graph data comprises a copy of one or more nodes preceding a proxy node in a node graph of the node graph application instance, and wherein the received input attributes comprise a copy of user inputs associated with the one or more nodes preceding the proxy node;
receiving, over the network, a request from the proxy node to evaluate the node graph data;
evaluating the node graph data based on the input attributes, wherein evaluating the node graph data comprises evaluating the copy of one or more nodes using at least the copy of user inputs; and
transmitting the evaluated node graph data over the network from a server to the proxy node.

16. The non-transitory computer-readable medium of claim 15, wherein the instructions, when executed by the processor, further perform an operation of: caching the evaluated node graph data.

17. The non-transitory computer-readable medium of claim 16, wherein the instructions, when executed by the processor, further perform an operation of: determining if the node graph data has been previously evaluated prior to evaluating the node graph data.

18. The non-transitory computer-readable medium of claim 17, wherein the evaluated node graph data is automatically transmitted to the computing device based on an update frequency specified by the computing device.

19. The non-transitory computer-readable medium of claim 17, wherein the server comprises a plurality of servers.

20. The non transitory computer-readable medium of claim 19, wherein the instructions, when executed by the processor, further perform operations of: receiving a plurality of node graph data sets and input attribute sets from a respective plurality of computing devices; and evaluating each of the plurality of node graph data sets using a respective one of the plurality of input attribute sets.

21. A system comprising:
a computing device configured to:
initiate a node graph application instance;
initiate evaluation of node graph data at the application based on input attributes received at the computing device, the node graph data comprising a node graph comprising a proxy node and one or more nodes preceding the proxy node in the node graph;
transmit to a server a copy of the one or more nodes preceding the proxy node and a copy of user inputs associated with the one or more nodes preceding the proxy node;
receive evaluating node graph data at the proxy node;
initiate a request at the proxy node to evaluate the one or more nodes preceding the proxy node on the server;
receive over a network from the server, server evaluated node graph data comprising an evaluation of the one or more nodes.

22. The system of claim 21, wherein the computing device further performs the step of determining if the node graph data has been locally cached before initiating a request to evaluate the one or more nodes on a server.

23. The system of claim 22, wherein the computing device is further configured to: receive evaluating node graph data at a second proxy node of the node graph; and initiating a request at the second proxy node to evaluate one or more nodes preceding the second proxy node on a server.

24. The system of claim 21, wherein the application comprises a viewport configured to output the evaluated node graph data on a display connected to the computing device.

25. The system of claim 24, wherein the server comprises a plurality of servers.

26. The system of claim 21, wherein the computing device further performs the step of querying the server for additional evaluated node graph data, wherein the additional evaluated node graph data is evaluated in response to input attributes received from a second computing device running a node graph application.

* * * * *